April 13, 1954  J. A. SCHULTE  2,674,836
ADJUSTABLE HARROW HITCH
Filed July 9, 1949
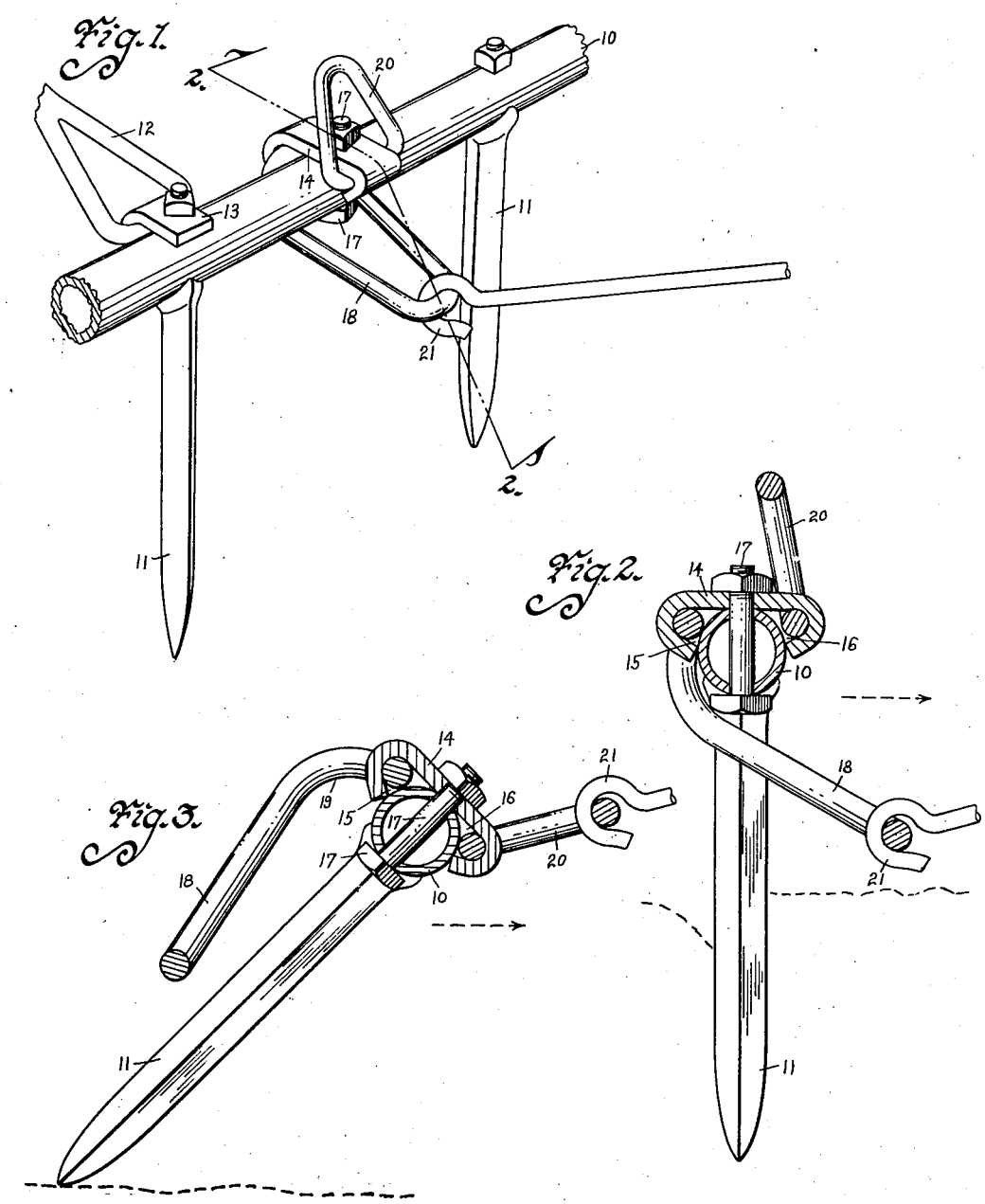
Witness
Edward P. Seeley
Inventor
John A. Schulte
by M. Talbert Dick
Attorney Patented Apr. 13, 1954

2,674,836

UNITED STATES PATENT OFFICE 2,674,836

ADJUSTABLE HARROW HITCH

John A. Schulte, Sac City, Iowa, assignor to Noble Manufacturing Company, Sac City, Iowa Application July 9, 1949, Serial No. 103,773

9 Claims. (Cl. 55—76)

Hitches for attaching a harrow to a drawbar, cable or the like generally cause no trouble in deep harrowing, that is, when the harrow teeth are in a vertical position. However, when the teeth are adjusted to various positions to the horizontal for shallow harrowing, it is obvious that the bar or tubing to which the teeth are attached will be closer to the ground. In this situation, the hitch which is secured to the tooth bar is likewise in close proximity to the ground and the closer it gets, the more likely its hitch connections are to catch cornstalks or other foreign matter that is usually present on the surface of the ground. This naturally reduces the efficiency of the harrow and frequently requires the operator to stop so he can free the objectionable matter. I have overcome these obstacles by a new device, the principal object of which is to provide a harrow hitch that will not become tangled in cornstalks or the like when the harrow teeth are set either in a vertical plane or at an angle thereto.

A further object of this invention is to provide a hitch for connecting a harrow to a drawbar that can be easily and quickly manually adjusted, when desired, to prevent any dragging that would interfere with the operation of the harrow.

A still further object of this device is to provide an adjustable harrow hitch of the above class that is economical in manufacture, easy to operate and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of this device shown in place on a fragmentary section of a harrow and adjusted for operation of the harrow with the teeth in substantially a vertical plane.

Fig. 2 is a cross-sectional view of this hitch taken on the line 2—2 of Fig. 1.

Fig. 3 is a similar cross-sectional view of this device as in Fig. 2, but showing the hitch adjusted for operation of the harrow with the teeth at an angle to the vertical.

Referring to the drawings, I have used the numeral 10 to designate the usual front bar or tubing of a harrow section and to which the harrow teeth 11 are detachably secured, as shown in Fig. 1. Each harrow section consists of a plurality of such tubes and teeth thereon.

The numeral 12 designates a fragmentary portion of link detachably secured to the tubing 10 by means of the bracket 13. This link, shown in Fig. 1, is the means for flexibly connecting one length of the tubing 10 to a similar tubing. By so flexibly connecting all the tubular bars together in spaced relationship a flexible harrow section is provided, which is standard and to which my invention is applied.

The numeral 14 designates a bracket formed from an elongated metal bar having each end thereof bent down and under in a U-shape to form the eye bearing members 15 and 16, as shown in Fig. 2.

The bracket 14 is arranged on the top side of the front tubing of a harrow section and is transverse to the longitudinal axis thereof so that the eyes 15 and 16, respectively, are adjacent the longitudinal sides of the tubing, as shown in Fig. 2. The bracket 14 is detachably secured to the tubing 10 by means of the bolt and nut 17.

The numeral 18 designates an elongated link that is tapered toward one end to make it slightly narrower than the other end. The larger end portion of the link 18 is arched to form the concave portion 19, as shown in Fig. 3. The numeral 20 designates a triangular shaped link.

In arranging my hitch on a harrow section the large end of the link 18 is hingably movably rested in the eye 15 of the bracket 14 so that the concave or arched portion 19 of the link 18 is adjacent the tubing 10 and the free end of the link passes under the tubing and extends to the front toward the motive power that will pull the harrow. The link 20 is hingably movably rested in the eye 16 of the bracket 14 so that the narrow end can be positioned to the front. It is necessary, of course, in arranging the hitch that the links 18 and 20 be positioned in the eyes 15 and 16 respectively of the bracket 14 before the bracket is bolted to the tubing 10.

For deep harrowing when the teeth are in a vertical plane, the free end of the link 18 is detachably secured to the motive power for pulling the harrow, which I have illustrated in my drawings by the fragmentary portion of a connecting link and its hook 21. This link is designed to be connected to a drawbar, which in turn is attached to the tractor or which can be directly connected to the tractor.

When the harrow teeth are tilted for shallow harrowing or for any other reason, it is only necessary for the operator to disengage the link 18 from the power source and to engage the link 20 of the hitch thereto in the same manner as for the link 18, as shown in Fig. 3. As soon as the link 18 is disengaged it will drop back of its own weight and rest hingably in the bracket 14 as shown in Fig. 3. In this position the free end of the link will ride easily over any obstacles that it may encounter for the reason that contact with any such obstacles will merely cause the link to yieldingly swing upwardly in the eye 15 and to drop again when the obstacle has been passed.

The link 20 when not being used is of course completely out of the way as far as contacting any obstacles and when it is engaged as above described it is at a higher elevation than the tubing 10, as shown in Fig. 3. In this position it permits the movement of the harrow without any danger of itself becoming entangled in any object on the ground. Thus I provide two link connections for selectively connecting the harrow section to the pulling means. Each section will have one or two such dual connecting means. For leveling or transporting, small link 20 will be used as the connecting means. When the links 20 are used there will be no tendency for the pull to draw the harrow teeth toward a vertical position. In deep harrowing, however, it is necessary to utilize the pull to hold the teeth in or near vertical positions. By my link 18 terminating at its free end at a point substantially forward and below the tubular bar, any pull on its free end will tend to straighten the teeth toward the vertical. Such is highly desirable in harrows of the "flexible" type. By the link 18 extending downwardly and around the tube bar, the tube bar acts as a stop to limit the under and forward swinging movement of the link, hereby maintaining the free end of the link in proper necessary position when used for deep harrowing. This link 18 should be used for all harrowing when the harrow teeth are to be positioned from vertical to near forty degrees from the vertical. From this position to horizontal the link 20 should be used. The selection of the link 20 instead of the link 18 will be in general, determined by and when the link 18 begins to either contact the ground or starts catching and picking up foreign matter such as vegetation, cornstalks, or like.

Some changes may be made in the construction and arrangement of my adjustable harrow hitch without departing from the real spirit and purpose of my invention, and it is my intention to cover by my claims, any modified forms of structure or use of mechanical equivalents which may be reasonably included within their scope.

I claim:

1. In a harrow hitch, a bar member having teeth thereon, a bracket designed to be detachably secured to said bar member, a means for detachably securing said bracket to said bar, eyes on the underside of each end of said bracket, a first link member tapered slightly toward one end and the other end arched to form a concave portion thereon; said link member resting hingably at its arched end in the rear eye of said bracket so that the concave portion of said link can be placed adjacent said bar member with its free end passing under and to the front of said bar, and a second link member resting hingably in the forward eye of said bracket; each of said links designed to be separately but not simultaneously operatively associated with a source of power for moving said harrow.

2. In a harrow hitch, a bar member having teeth secured thereto, a bracket secured to said bar member, a link member arched intermediate its ends and hingably secured to one end of bracket, said link capable of passing under and outwardly from said bar member and engaging the same, a second link hingably secured to the other end of said bracket, each of said links designed to be separately but not simultaneously connected to a source of power for pulling said bar member, the direction of pull being the same no matter which link is connected thereto and said first link when so connected holding said teeth in a vertical plane and said second link when so connected causing said teeth to assume an effectively inoperative position.

3. In a harrow hitch, an elongated bar member having teeth secured thereto, said bar designed to be pulled in a direction transversely of its longitudinal axis, a bracket secured to and transversely of said bar member to form a front and rear end respectively, a link member arched intermediate its ends and hingably secured to the rear end of bracket, said link capable of passing under and forwardly from said bar member and engaging the same, a second link hingably secured to the front end of said bracket, each of said links designed to be separately but not simultaneously connected to a source of power for pulling said bar member, the direction of pull being the same no matter which link is connected thereto and said first link when so connected holding said teeth in a vertical plane and said second link when so connected causing said teeth to assume an effectively inoperative position.

4. In a harrow hitch, a bar member having vertical teeth secured thereto, a bracket secured to said bar member, a link member arched intermediate its ends and hingably secured to one end of bracket, said link capable of passing under and outwardly from said bar member and engaging the same, a second link hingably secured to the other end of said bracket, each of said links designed to be separately but not simultaneously connected to a source of power for pulling said bar member, the direction of pull being the same no matter which link is connected thereto each of said links capable of transmitting a pulling force to said bar member and one of said links serving as a force transmitting member to urge said teeth toward the vertical.

5. In a harrow hitch, a bar member having teeth secured thereto, a bracket secured to said bar member, a first link member hingably secured to one end of said bracket, a second link member arched intermediate its ends and hingably secured to the other end of said bracket, said second link member capable of passing under and outwardly from said bar member and engaging the same, each of said links designed to be separately but not simultaneously connected to a source of power for pulling said bar member, said first link capable of transmitting only a pulling force to said bar member, and said second link member capable of transmitting a pulling force to said bar member and also serving as a force transmitting member to urge said teeth toward the vertical.

6. In a harrow hitch, a bar member having teeth secured thereto, a bracket secured to said bar member, a first link member hingably secured to one end of said bracket, a second link member arched intermediate its ends and hingably secured to the other end of said bracket, said second link member capable of passing under and outwardly from said bar member and engaging the same, each of said links designed to be separately but not simultaneously connected to a source of power for pulling said bar member, said first link capable of transmitting only a pulling force in one direction to said bar member, and said second link member capable of transmitting a pulling force in the same direction to said bar member and also serving as a force transmitting member to urge said teeth toward the vertical.

7. In a harrow hitch, an elongated bar member having a plurality of spaced apart vertically depending teeth thereon, said bar designed to be pulled over the ground in a direction transversely of its longitudinal axis, a bracket secured to and transversely of said bar member and having a rear and forward end, eyes on each end of said bracket, a first link member hingably arranged in said forward eye, a second link member arched intermediate its ends hingably arranged in said rear eye and capable of passing under and forwardly of said bar member and engaging the same, each of said links designed to be separately but not simultaneously connected to the same source of power for pulling said bar member, each of said links capable selectively of transmitting a pulling force to said bar member in the same direction, and said second link capable of serving as a force transmitting member to urge said teeth toward the vertical.

8. In a harrow hitch, a tubular bar member having teeth thereon, a bracket detachably secured to said tubular bar member, eyes on the underside of each end of said bracket, an elongated link arched intermediate its ends; said link resting hingably in one end in the rear eye of said bracket so that its arched portion can be placed adjacent said tubular bar with the free end of said link passing under and to the front of said bar member, and a triangular link smaller in size than said first link; said second named link resting hingably in the forward eye of said bracket; each of said links respectively designed to be separately operatively associated at times with a same source of power for moving said harrow hitch in the same direction.

9. In combination with a harrow having a tooth supporting member, an adjustable harrow hitch comprising, a bracket detachably secured transversely of said tooth supporting member, eyes on each end of said bracket, an elongated link member arched at one end to form a concave portion thereon; said link resting hingably at its arched end in the rear eye of said bracket so that the concave portion of said link can be placed adjacent said supporting member with its free end passing under and to the front of said supporting member, a second link member resting hingably in the front eye of said bracket; each of said links respectively designed to be operatively associated at times with a pulling force that is from the same direction irrespective of which link is associated therewith.

References Cited in the file of this patent

UNITED STATES PATENTS

| Number | Name | Date |
|---|---|---|
| 577,476 | Akers | Feb. 23, 1897 |
| 725,359 | Pfeiffer et al. | Apr. 14, 1903 |
| 965,390 | Lindgren | July 26, 1910 |
| 1,067,506 | Davis et al. | July 15, 1913 |
| 1,385,861 | Comrie | July 26, 1921 |